US012602460B2

(12) United States Patent
Sekine

(10) Patent No.: US 12,602,460 B2
(45) Date of Patent: Apr. 14, 2026

(54) INFORMATION PROCESSING DEVICE AND INFORMATION PROCESSING METHOD

(71) Applicant: Toshiba Tec Kabushiki Kaisha, Tokyo (JP)

(72) Inventor: Naoki Sekine, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 80 days.

(21) Appl. No.: 18/506,089

(22) Filed: Nov. 9, 2023

(65) Prior Publication Data

US 2024/0248970 A1 Jul. 25, 2024

(30) Foreign Application Priority Data

Jan. 23, 2023 (JP) ................................. 2023-008025

(51) Int. Cl.
G06F 21/31 (2013.01)
H04L 9/40 (2022.01)
(52) U.S. Cl.
CPC .......... G06F 21/316 (2013.01); H04L 63/083 (2013.01)
(58) Field of Classification Search
CPC ........ G06F 21/316; G06F 21/31; G06F 21/45; H04L 63/083; H04L 63/0861; H04L 2463/082; H04L 9/3226; H04W 12/06
See application file for complete search history.

(56) References Cited

U.S. PATENT DOCUMENTS 7,552,467 B2 * 6/2009 Lindsay ................ G07F 7/1025
713/168
9,137,238 B1 * 9/2015 Jakobsson ............... G06F 21/46

9,646,167 B2 * 5/2017 Lewis ................... G06F 40/166
11,399,021 B2 * 7/2022 Endler .................... G06F 21/46
11,438,360 B2 * 9/2022 Endler ................. H04L 63/083
11,558,409 B2 * 1/2023 Endler ............... H04L 63/0846
(Continued)

FOREIGN PATENT DOCUMENTS

JP 2005-208931 A 8/2005
WO 2016/068007 A1 5/2016
WO 2020/016985 A1 1/2020

OTHER PUBLICATIONS

Notice of Reasons for Refusal mailed Feb. 3, 2026 in corresponding Japanese Patent Application No. 2023-008025, 8 pages (with Translation).

*Primary Examiner* — Hosuk Song
(74) *Attorney, Agent, or Firm* — Kim & Stewart LLP

(57) ABSTRACT

An information processing device includes a memory that stores a plurality of pieces of user information each for authenticating a user and indicating previous access attempts and unsuccessful login attempts by the user, a communication interface circuit connectable to a terminal, and a processor configured to: in response to a login attempt from the terminal, acquire login information indicating a user from the terminal, search the memory for one of the pieces of user information corresponding to the user, determine a threshold value for determining whether to reject the login attempt at least based on the previous access attempts by the user, compare a number of the unsuccessful login attempts by the user with the determined threshold value, and determine whether to reject the login attempt based on a comparison result of the number of the unsuccessful login attempts and the threshold value.

11 Claims, 4 Drawing Sheets

(56) References Cited

U.S. PATENT DOCUMENTS

| 11,888,843 | B2 * | 1/2024 | Endler | ................ | H04L 63/1433 |
| 12,113,794 | B2 * | 10/2024 | Alotaibi | ................ | H04L 63/102 |
| 12,166,794 | B2 * | 12/2024 | Endler | ................ | H04L 63/1433 |
| 2017/0308688 | A1 | 10/2017 | Orihara et al. | | |

* cited by examiner

FIG. 2

| ITEM | |
|---|---|
| USER NAME | XXX |
| PASSWORD | aaaaa |
| LAST LOGIN DATE AND TIME | 2022.11.11, 08:10:00 |
| NUMBER OF USER ACCESSES DURING d DAYS | 2 |
| CURRENT NUMBER OF ACCESS FAILURES | 2 |
| PREVIOUS ACCESS TIME | 2022.11.15, 07:59:00 |
| PREVIOUSLY ENTERED PASSWORD | aaaab |
| NUMBER OF PACKETS FOR ONE HOUR | YYY |
| ... | ... |

*FIG. 4*

INFORMATION PROCESSING DEVICE AND INFORMATION PROCESSING METHOD

CROSS-REFERENCE TO RELATED APPLICATION

This application is based upon and claims the benefit of priority from Japanese Patent Application No. 2023-008025, filed on Jan. 23, 2023, the entire contents of which are incorporated herein by reference.

FIELD

Embodiments described herein relate generally to an information processing device and an information processing method.

BACKGROUND

User authentication using a combination of a user name and a password is commonly used by electronic commerce or electronic mail services. Such authentication is convenient because a user can access his or her account from anywhere by using a web browser or the like. However, damage caused by unauthorized login such as account takeover has been reported.

Particularly, brute force attacks for cracking passwords by checking all possible combinations of letters, numerals, and symbols, are occasionally seen, and many service providers struggle to cope with such attacks. The service providers can take measures against unauthorized logins, for example, by a method of detecting password entry errors that are made a predetermined number of times or login challenges within a short time or the like and temporarily suspending the account, or by a method of rejecting a login attempt under some conditions even if the correct password is entered, and thus preventing the malicious attacker from finding out the correct password, or the like.

However, the method of suspending an account is a measure for buying time and its effect to repel checking of all possible passwords is limited. Also, even in the case of rejecting a login attempt under some conditions, the number of login rejections is fixed and therefore convenience for legitimate users is undermined.

BRIEF DESCRIPTION OF THE DRAWINGS

FIG. 2 illustrates a data structure of user information.

FIG. 4 is a flowchart of information processing for operation decision.

DETAILED DESCRIPTION

Figure 1:
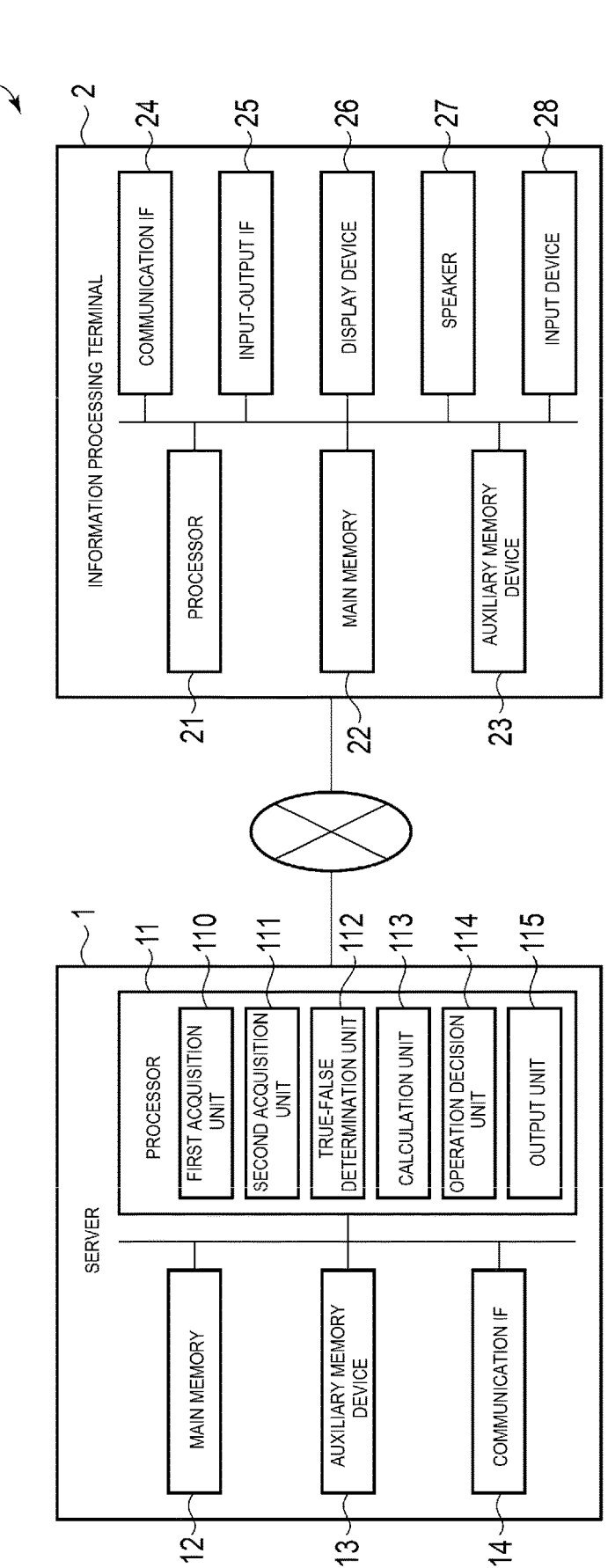
FIG. 1 is a block diagram illustrating an information processing system according to an embodiment.

Embodiments described herein provide an information processing device and an information processing method that enable measures against unauthorized logins without undermining convenience for legitimate users.

In general, according to one embodiment, an information processing device, comprises a memory that stores a plurality of pieces of user information each for authenticating a user and indicating previous access attempts and unsuccessful login attempts by the user; a communication interface circuit connectable to a terminal; and a processor configured to: in response to a login attempt from the terminal, acquire login information indicating a user from the terminal, search the memory for one of the pieces of user information corresponding to the user, determine a threshold value for determining whether to reject the login attempt at least based on the previous access attempts by the user, compare a number of the unsuccessful login attempts by the user with the determined threshold value, and determine whether to reject the login attempt based on a comparison result of the number of the unsuccessful login attempts and the threshold value.

Embodiments will now be described with reference to the drawings. In the drawings, an identical component is denoted by the same reference numeral.

FIG. 1 is a block diagram illustrating an information processing system 100 according to an embodiment.

The information processing system 100 includes a server 1 and an information processing terminal 2. The server 1 and the information processing terminal 2 are communicably connected to each other via one or more networks such as the Internet, a mobile communication network, and a LAN (local area network). The one or more networks may include a wireless network and/or a wired network.

The server 1 is an electronic device that collects data and processes the collected data. For example, the server 1 is a server for an electronic commerce or electronic mail service or the like that involves login authentication. The electronic device includes a computer. The server 1 is communicably connected to the information processing terminal 2 via the network. The server 1 receives various data from the information processing terminal 2 and outputs various data to the information processing terminal 2. An example of the configuration of the server 1 will be described later.

The information processing terminal 2 is an electronic device configured to be able to communicate with another electronic device. The information processing terminal 2 is, for example, a device used by a user performing login authentication. For example, the information processing terminal 2 is a PC (personal computer), a smartphone, or a tablet terminal or the like. The user may be referred to as a person. An example of the configuration of the information processing terminal 2 will be described later.

An example of the configuration of the server 1 will now be described.

The server 1 is an electronic device including a processor 11, a main memory 12, an auxiliary memory device 13, and a communication interface 14. The components forming the server 1 are connected in such a way as to be able to input and output a signal to and from each other. In FIG. 1, the interface is abbreviated as "IF".

The processor 11 is a core element of the server 1. For example, the processor 11 is a CPU (central processing unit) but is not limited to this. The processor 11 may be formed of various circuits or hardware components. The processor 11 loads a program stored in the auxiliary memory device 13 into the main memory 12. The program causes the processor 11 of the server 1 to execute each of the functions described later. The processor 11 executes the program loaded in the main memory 12 and thus executes various operations.

The main memory 12 includes a non-volatile memory area and a volatile memory area. The non-volatile memory area of the main memory 12 stores an operating system or a program. In the main memory 12, the volatile memory area is used as a work area where data is rewritten by the processor 11. For example, the main memory 12 includes a ROM (read-only memory) as the non-volatile memory area.

For example, the main memory 12 includes a RAM (random-access memory) as the volatile memory area.

The auxiliary memory device 13 is an EEPROM® (electrically erasable programmable read-only memory), an HDD (hard disk drive), or an SSD (solid-state drive) or the like. The auxiliary memory device 13 stores the foregoing program, data used by the processor 11 to perform various processing, and data generated as a result of processing by the processor 11.

The auxiliary memory device 13 stores user information of the user of the information processing terminal 2. The user information includes information about the login by the user of the information processing terminal 2. The user information includes user identification information, the password, the last login date and time, the number of logins during d days, d being a natural number equal to or greater than 1, the current number of access failures, the previous access time, the previously entered password, the number of packets transmitted to and/or received from the information processing terminal 2 during a predetermined time, e.g., one hour, and the like.

The user identification information is unique identification information given to each user. Each user identification information includes, for example, a user ID, a user name, and the like. The password is used for login that is set arbitrarily by the user. The last login date and time represents the date and time when the user logged in the last time. The number of logins during d days represents the number of times the user login is authenticated during d days. The login authentication includes a success in login. The number of logins during d days includes, for example, the number of logins during the past five days, the number of logins during the past week, or the like.

The current number of access failures refers to the number of access failures as of the current time. The number of access failures refers to the number of times a login was not authenticated. The current number of access failures refers to the number of user accesses (access attempts) made by the user in the past in connection with the current login attempt. The current login attempt is the entry of the login information in order to log in again after logging out following a previous login authentication. An access (access attempt) refers to the entry of login information by the user. In some instances, an access (access attempt) may refer to the entry of the password by the user. The current number of access failures may also be simply referred to as the number of failures. The number of failures refers to the number of times the login information has been entered by the user before the current entry of the login information after the previous login authentication. The number of failures does not include the current entry of the login information. The number of failures is the sum of the number of times the login failed due to a false password determination by the server 1 in the past and the number of times the login failed due to a login rejection by the server 1 in the past, in connection with the current login attempt.

For example, a case where a user enters a correct password after entering a wrong password twice in the past will now be described. If the server 1 has given a false password determination twice in the past, the current number of access failures is two. The false password determination means that the password is determined as wrong by the server 1 due to a password entry error or the like. The determination that the password is wrong includes the determination that the password is not correct. If the server 1 makes the false password determination once and rejects the login once, the current number of access failures is two. The rejection of the login means that the login is not approved and rejected by the server 1, when the user enters the correct password and the server 1 makes a true password determination once. The true password determination means that the password is determined as correct by the server 1. If the server 1 makes the true password determination twice and rejects the login in both of the two cases where the true password determination is made, the current number of access failures is two.

The previous access time refers to the time when the user previously entered the login information. The previously entered password refers to the password previously entered by the user. The number of packets for one hour is the number of packets during the past one hour involved in the access to the server 1 by the user specified by the user name. The user information may include the identification information of the information processing terminal 2. The identification information of the information processing terminal 2 is unique identification information given to each information processing terminal. The identification information of the information processing terminal includes an IP address used by the information processing terminal, or the like.

The communication interface 14 includes various interface circuits that communicably connect the server 1 to another electronic device via a network in conformity with a predetermined communication protocol.

The hardware configuration of the server 1 is not limited to the foregoing configuration. In the server 1, one or more of the foregoing components may be omitted or changed and a new component may be added according to need.

The functions performed by the processor 11 will now be described.

The processor 11 performs the functions of: a first acquisition unit 110, a second acquisition unit 111, a true-false determination unit 112, a calculation unit 113, an operation decision unit 114, and an output unit 115. Those units performed by the processor 11 may be performed by a controller including the processor 11 and the main memory 12.

The first acquisition unit 110 acquires login information from the information processing terminal 2 via the communication interface 14. The login information includes a user name and a password.

The second acquisition unit 111 acquires user information of a user of the information processing terminal 2 stored in the auxiliary memory device 13. The second acquisition unit 111 acquires the user information corresponding to the user of the information processing terminal 2, based on the user name acquired by the first acquisition unit 110.

The true-false determination unit 112 performs a true-false determination of the password based on the acquired login information and user information. The true-false determination includes a true password determination and a false password determination. The true-false determination unit 112 compares the password entered by the user of the information processing terminal 2 with the password included in the user information and thus performs the true-false determination of the password. The true-false determination of the password can be implemented by a known technique.

The calculation unit 113 calculates the number of login rejections N based on the login information and the user information. The number of login rejections N is a threshold to be compared with the number of failures in order to approve the login for which the true password determination is made by the server 1 in connection with the current login attempt. If the number of failures is greater than the number of login rejections N, the server 1 approves the login for which the true password determination is made by the server 1 in connection with the current login attempt. If the number of failures is equal to or smaller than N, the operation decision unit 114 rejects the login for which the true password determination is given by the server 1 in connection with the current login attempt.

For example, a case where the number of login rejections N is "3" will now be described. If a password entered by a user is determined as true three times from the state where the number of failures is 0, the server 1 rejects the login three times. If a password entered by a user twice in the past is determined as false from the state where the number of failures is 0, and the user then enters the correct password in the third attempt and the server 1 makes the true password determination, the login in the third attempt is rejected.

The calculation unit 113 may calculate the number of login rejections N based on the frequency of use by a user. The frequency of use refers to the frequency at which a user login is authenticated. The calculation unit 113 may calculate N as N=0 if the frequency of use by a user is high, and may increase the value of N if the frequency of use is low. For example, if the frequency of use is ten times or more per day, the calculation unit 113 may calculate N as N=0. If the frequency of use is less than once per two days, the calculation unit 113 may increase the value of N. The calculation unit 113 may calculate the number of login rejections N, for example, as N=K/(the number of logins during d days), where K is a parameter (or hyperparameter) that can be set by an administrator of the information processing system 100 or otherwise. The frequency of use may also be referred to as the frequency of logins.

The calculation unit 113 may also calculate the number of login rejections N based on the number of accesses by a user. The calculation unit 113 may increase the value of N if the number of accesses by a user is large, and may decrease the value of N if the number of accesses is small. The calculation unit 113 may calculate the number of login rejections N, for example, as N=the number of packets for one hour/K. In this example, if the number of accesses increases due to a brute force attack or the like, the number of login rejections N can be increased to cope with unauthorized logins.

The calculation unit 113 may also calculate the number of login rejections N based on the difference between the previous access time and the current access time of a user. The calculation unit 113 may increase the value of N if the difference from the previous access time of a user is large, and may decrease the value of N if the difference from the previous access time of the user is small. The calculation unit 113 may calculate the number of login rejections N, for example, as N=K/(the current time–the previous access time). In this example, if accesses are successively made within a short time due to an automated attack or the like, the number of login rejections N can be increased to cope with unauthorized logins.

The calculation unit 113 may also calculate the number of login rejections N based on the degree of similarity between the previously entered password and the currently entered password. The calculation unit 113 may increase the value of N if the degree of similarity between the previously entered password and the currently entered password is high, and may decrease the value of N if the degree of similarity between the previously entered password and the currently entered password is low. The calculation unit 113 may calculate the number of login rejections N, for example, as N=the distance between the character strings (the currently entered password and the previously entered password)/K.

In this example, if the difference between the currently and previously entered passwords is just one letter (e.g., "xxxxa" and "xxxxb") entered back-to-back (in attempt sequence) such may be the case as in a brute force attack or the like, the number of login rejections N can be increased to cope with unauthorized logins. For example, the calculation unit 113 calculates the degree of similarity between the previously entered password and the currently entered password, for example, based on the distance between the character strings of the passwords. The distance between the character strings of the passwords can be calculated, for example, by a known technique for quantifying the degree of similarity between character strings such as the Levenshtein distance technique.

The operation decision unit 114 decides a login approval or rejection based on the number of login rejections N and the number of failures. The operation decision unit 114 compares the number of login rejections N calculated by the calculation unit 113 with the number of failures included in the user information. The operation decision unit 114 approves the login if the number of failures is greater than the number of login rejections N. The operation decision unit 114 rejects the login if the number of failures is equal to or smaller than the number of login rejections N.

The output unit 115 controls the communication interface 14 to output or transmit information representing the result of the login approval or rejection by the operation decision unit 114 to the information processing terminal 2. The output unit 115 controls the communication interface 14 to output approval information representing the login approval by the operation decision unit 114 to the information processing terminal 2. The output unit 115 controls the communication interface 14 to output rejection information representing the login rejection by the operation decision unit 114 to the information processing terminal 2. The information processing terminal 2 displays a login approval notification or a login rejection notification on a display device 26 based on the information representing the result of the login approval or rejection.

An example of the configuration of the information processing terminal 2 will now be described.

The information processing terminal 2 is an electronic device including a processor 21, a main memory 22, an auxiliary memory device 23, a communication interface 24, an input-output interface 25, the display device 26, a speaker 27, and an input device 28. The components forming the information processing terminal 2 are connected in such a way as to be able to input and output a signal to and from each other.

The processor 21 is a core element of the information processing terminal 2. The processor 21 has a hardware configuration similar to the hardware configuration of the foregoing processor 11. The processor 21 executes a program stored in the main memory 22 or the auxiliary memory device 23 and thus executes various operations.

The main memory 22 has a hardware configuration similar to the hardware configuration of the foregoing main memory 12. The main memory 22 stores a program.

The auxiliary memory device 23 has a hardware configuration similar to the hardware configuration of the foregoing auxiliary memory device 13. The auxiliary memory device 23 stores a program. The auxiliary memory device 23 further stores user information of a user of the information processing terminal 2.

The communication interface 24 includes various interface circuits that communicably connect the information processing terminal 2 to another electronic device via a network in conformity with a predetermined communication protocol.

The input-output interface 25 is an interface circuit connectable to an external device. The external device includes an external microphone configured to take in a sound, an external speaker, or the like. The input-output interface 25 is, for example, a USB (universal serial bus) interface or the like.

The display device 26 displays various screens under the control of the processor 21. For example, the display device 26 is a liquid crystal display or an EL (electroluminescence) display or the like.

The speaker 27 outputs a sound under the control of the processor 21.

The input device 28 accepts an input of data or an instruction to the information processing terminal 2. For example, the input device 28 includes a built-in microphone configured to take in a sound and a built-in camera configured to acquire image capture data within an image capture range. The input device 28 may include a keyboard or a touch panel or the like.

The hardware configuration of the information processing terminal 2 is not limited to the foregoing configuration. In the information processing terminal 2, one or more of the foregoing components may be omitted or changed and a new component may be added according to need.

An example of the configuration of the data structure of the user information stored in the auxiliary memory device 13 of the server 1 will now be described.

FIG. 2 illustrates the data structure of the user information according to an embodiment. The user information includes data of the user name, the password, the last login date and time, the number of logins during d days, the current number of access failures, the previous access time, the previously entered password, and the number of packets for one hour or the like correlated with each other for each user.

For example, FIG. 2 shows user information in the case where a user with his or her user name "XXX" entered login information at 8:00, Nov. 15, 2022. The password "aaaaa" is set for the user "XXX". The last login date and time, which represents the date and time when the user "XXX" previously succeeded in login, is "8:00:00, Nov. 11, 2022". In this example, the number of logins during d days is assumed to represent the number of logins during five days, that is, d=5. The number of logins during five days of the user "XXX" is "2".

The current number of access failures in connection with the user access made by the user "XXX" in the current login attempt is "2". In this example, it is assumed that the user "XXX" entered the login information for the third time. It is assumed, for example, that a false password determination was made in the past one password entry and the user "XXX" failed to log in.

The previous access time of the user "XXX" is "7:59:00, Nov. 15, 2022". This means that the time when the user "XXX" previously entered the login information is "7:59: 00, Nov. 15, 2022". It can be seen that the user "XXX" entered the login information for the third time, one minute after the time of the entry of the current login information.

The password previously entered by the user "XXX" is "aaaab". The number of packets for one hour is "YYY".

Processing performed by the information processing system 100 will now be described.

In the description below, the server 1 or its processor 11 performs the described steps. The processing procedures described below are simply an example. Each step may be changed. In the processing described below, a step can be omitted, replaced, or added.

Figure 3:
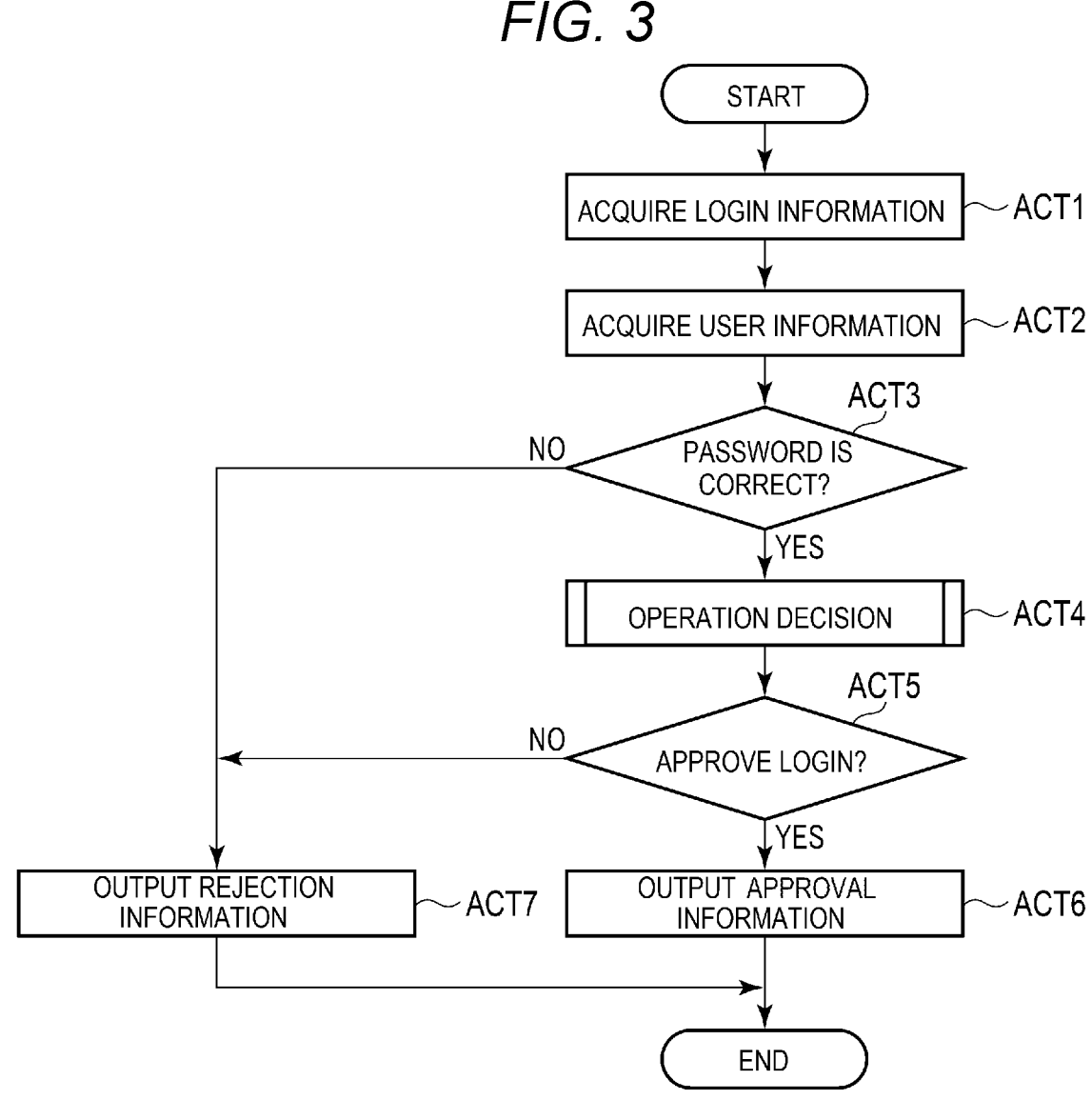
FIG. 3 is a flowchart of information processing performed by a server.

FIG. 3 is a flowchart of information processing performed by the server 1 according to an embodiment.

The first acquisition unit 110 acquires login information from the information processing terminal 2 (ACT 1). In ACT 1, for example, the first acquisition unit 110 acquires a user name and a password entered by the user of the information processing terminal 2 via the input device 28, from the information processing terminal 2 via the communication interface 14.

After ACT 1, the second acquisition unit 111 acquires user information of the user of the information processing terminal 2 stored in the auxiliary memory device 13 (ACT 2). In ACT 2, for example, the second acquisition unit 111 refers to the user information and acquires at least the password correlated with the user name of the information processing terminal 2.

The true-false determination unit 112 performs a true-false determination of the password based on the login information and the user information (ACT 3). In ACT 3, for example, the true-false determination unit 112 compares the password acquired by the first acquisition unit 110 with the password correlated with the username of the information processing terminal 2 acquired by the second acquisition unit 111. The true-false determination unit 112 makes a true password determination if the password acquired by the first acquisition unit 110 and the password acquired by the second acquisition unit 111 coincide with each other. The true-false determination unit 112 makes a false password determination if the password acquired by the first acquisition unit 110 and the password acquired by the second acquisition unit 111 do not coincide with each other. If the true-false determination unit 112 makes the true password determination (YES in ACT 3), the processing shifts from ACT 3 to ACT 4. If the true-false determination unit 112 makes the false password determination (NO in ACT 3), the processing shifts from ACT 3 to ACT 7.

The operation decision unit 114 performs an operation decision about login approval or rejection, based on the number of login rejections N and the number of failures (ACT 4). In ACT 4, for example, the operation decision unit 114 determines whether the login is approved or rejected, based on the number of login rejections N calculated by the calculation unit 113.

After the login approval or rejection determination in ACT 4, if the operation decision unit 114 determines that the login is approved (YES in ACT 5), the processing shifts from ACT 5 to ACT 6. If the operation decision unit 114 determines that the login is not approved (NO in ACT 5), the processing shifts from ACT 5 to ACT 7.

The output unit 115 controls the communication interface 14 to output login approval information representing the result of the login approval to the information processing terminal 2, based on the result of the determination by the operation decision unit 114 (ACT 6). In ACT 6, for example, the output unit 115 controls the communication interface 14 to output the login approval information to the information processing terminal 2, based on the result of the determination to approve the login by the operation decision unit 114. The information processing terminal 2 displays a login approval notification on the display device 26, based on the login approval information. The information processing terminal 2 may output the login approval notification via the speaker 27, based on the login approval information. The login approval notification may include text information, a video, a sound or the like.

The output unit 115 controls the communication interface 14 to output login rejection information representing the result of the login rejection to the information processing terminal 2, based on the result of the determination by the true-false determination unit 112 or the result of the determination by the operation decision unit 114 (ACT 7). In ACT 7, for example, the output unit 115 controls the communication interface 14 to output the login rejection information to the information processing terminal 2, based on the false password determination by the true-false determination unit 112. The output unit 115 controls the communication interface 14 to output the login rejection information to the information processing terminal 2, based on the result of the determination to reject the login by the operation decision unit 114. The information processing terminal 2 displays a login rejection notification on the display device 26, based on the login rejection information. The information processing terminal 2 may output the login rejection notification via the speaker 27, based on the login rejection information. The login rejection notification may include text information, a video, a sound or the like.

Figure 4:
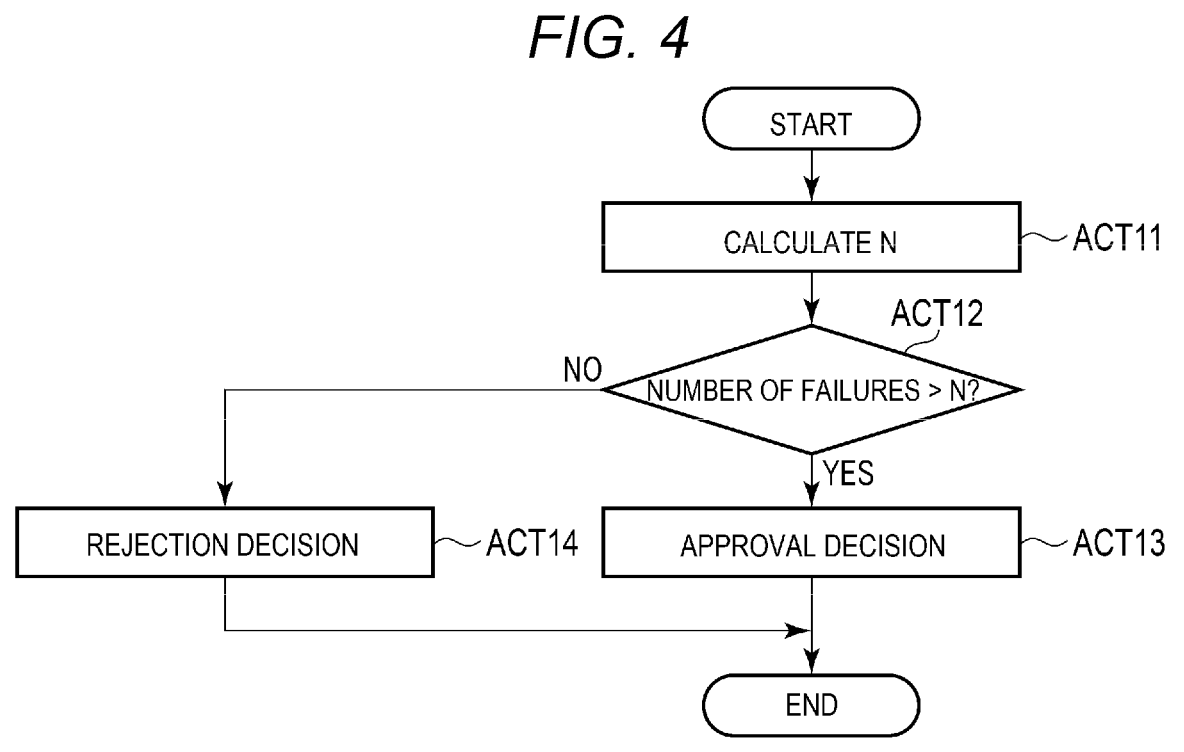

FIG. 4 is a flowchart of information processing for the operation decision performed in ACT 4 by the server 1 according to an embodiment.

The calculation unit 113 calculates the number of login rejections N, with N being a natural number equal to or greater than 0, based on the login information and the user information (ACT 11). In ACT 11, for example, the calculation unit 113 dynamically calculates the number of login rejections N, based on one of the techniques given below.

In the first technique, the calculation unit 113 calculates the number of login rejections N, based on the frequency of logins by the user. The calculation unit 113 refers to the user information and calculates the frequency of logins, which indicates how often the user logged in during a predetermined period, based on "the number of logins during d days". The calculation unit 113 calculates the number of login rejections N, for example, as N=K/(the number of logins during d days).

In the second technique, the calculation unit 113 calculates the number of login rejections N, based on the number of accesses by the user. The calculation unit 113 refers to the user information and calculates the number of accesses, based on "the number of packets for one hour". The calculation unit 113 calculates the number of login rejections N, for example, as N=the number of packets for one hour/K. The calculation unit 113 calculates the number of login rejections N with reference to the communication load from the information processing terminal 2.

In the third technique, the calculation unit 113 calculates the number of login rejections N, based on the difference between the access time of the user based on the acquisition of the login information and the previous access time included in the user information. For example, the calculation unit 113 refers to the user information and calculates the difference between the previous access time and the current access time, based on the difference between "the previous access time" and the current time. The calculation unit 113 calculates the number of login rejections N, for example, as N=K/(the current time–the previous access time). The calculation unit 113 calculates the number of login rejections N in such a way as to be in inverse proportion to the difference between the previous access time and the current access time.

In the fourth technique, the calculation unit 113 calculates the number of login rejections N, based on the degree of similarity between the login information and the previous login information included in the user information. For example, the calculation unit 113 calculates the number of login rejections N, based on the degree of similarity between the character string of the password included in the login information and the character string of the password included in the previous login information. The calculation unit 113 refers to the user information and calculates the distance between the character strings of "the previously entered password" and the currently entered password. The calculation unit 113 calculates the number of login rejections N, for example, as N=the distance between the character strings (the currently entered password and the previously entered password)/K. If the currently entered password and the previously entered password perfectly coincide with each other and the distance between the character strings is 0, a predetermined value may be used. The calculation unit 113 calculates the number of login rejections N in such a way as to be in proportion to the degree of similarity between the previously entered password and the currently entered password.

The operation decision unit 114 determines whether the login is approved or rejected, based on the number of login rejections N and the number of failures (ACT 12). In ACT 12, for example, the operation decision unit 114 compares the number of login rejections N calculated by the calculation unit 113 with "the current number of access failures" included in the user information. The operation decision unit 114 determines whether the number of failures is greater than the number of login rejections N or not. If the operation decision unit 114 determines that the number of failures is greater than the number of login rejections N (YES in ACT 12), the processing shifts from ACT 12 to ACT 13. If the operation decision unit 114 determines that the number of failures is not greater than the number of login rejections N (NO in ACT 12), the processing shifts from ACT 12 to ACT 14.

The operation decision unit 114 makes an approval decision to approve the login (ACT 13) or a rejection decision to reject the login (ACT 14).

The server 1 according to the above-described embodiment can acquire login information, acquire user information of a user, calculate the number of login rejections, based on the login information and the user information, and determine whether the login is approved or rejected, based on the number of login rejections and the number of failures.

For example, the server 1 sets the number of login rejections and rejects a login under a predetermined condition, and thus can prevent a malicious attacker from finding out the correct password. The server 1 can dynamically change the number of login rejections, based on the login information and the user information, and therefore can set the number of login rejections in such a way as not to undermine the convenience for the user, based on the login information currently entered by the user and the login history or the like. Thus, the server 1 can take measures against unauthorized logins without undermining the convenience for the user.

The server 1 according to the above-described embodiment can calculate the number of login rejections, based on the difference between the access time of the user based on the acquisition of the login information and the previous access time included in the user information. Therefore, the server 1 can increase the number of login rejections to cope with an automated attack where accesses are successively made within a short time, or the like. Thus, the server 1 can take measures against unauthorized logins that are effective against automatic attacks, without undermining the convenience for the user.

The server 1 according to the above-described embodiment can calculate the number of login rejections, based on the degree of similarity between the login information and the previous login information included in the user information. Therefore, the server 1 can increase the number of login rejections if similar login information is successively entered. Thus, the server 1 can take measures against unauthorized logins that are effective against an attack where login information is mechanically changed, without undermining the convenience for the user.

The server 1 according to the above-described embodiment can calculate the number of login rejections, based on the degree of similarity between the character string of the password included in the login information and the character string of the password included in the previous login information. Therefore, the server 1 can increase the number of login rejections if similar login information is entered one after another, as in a brute-force attack. Thus, the server 1 can take measures against unauthorized logins that are effective against an attack where login information is mechanically changed, without undermining the convenience for the user.

The foregoing embodiment may be expressed as follows.

[1] An information processing device including: a first acquisition unit configured to acquire login information; a second acquisition unit configured to acquire user information of a user; a calculation unit configured to calculate a number of login rejections, based on the login information and the user information; and an operation decision unit configured to decide a login approval or rejection, based on the number of login rejections and a number of failures.

[2] The information processing device according to [1], wherein the calculation unit calculates the number of login rejections, based on a difference between an access time of the user based on the acquisition of the login information and a previous access time included in the user information.

[3] The information processing device according to [1], wherein the calculation unit calculates the number of login rejections, based on a degree of similarity between the login information and previous login information included in the user information.

[4] The information processing device according to [3], wherein the degree of similarity is the degree of similarity between a character string of a password included in the login information and a character string of a password included in the previous login information.

[5] An information processing program causing a computer to execute: a first acquisition function configured to acquire login information; a second acquisition function configured to acquire user information of a user; a calculation function configured to calculate a number of login rejections, based on the login information and the user information; and an operation decision function configured to decide a login approval or rejection, based on the number of login rejections and a number of failures.

The server 1 may include a plurality of devices such that its functions are performed thereby.

The foregoing embodiment may be applied not only to a device but also to a method executed by a device. The foregoing embodiment may also be applied to a program that can cause a computer to execute each function. Such a program may be stored in the server 1 in advance or copied via a network or a recording medium. The recording medium is a non-transitory tangible medium. The recording medium is a computer-readable medium. The recording medium may be any form of medium that can store a program and is readable by a computer, such as a CD-ROM or a memory card.

While some embodiments have been described, these embodiments are presented simply as examples and are not intended to limit the scope of the present disclosure. These novel embodiments can be implemented in various other forms and can include various omissions, replacements, and changes without departing from the spirit and scope of the present disclosure. These embodiments and modifications thereof are included in the spirit and scope of the present disclosure and also included in the scope of the claims and equivalents thereof.

What is claimed is:

1. An information processing device, comprising:
   a memory that stores a plurality of pieces of user information each for authenticating a user and indicating previous access attempts and unsuccessful login attempts by the user;
   a communication interface circuit connectable to a terminal; and
   a processor configured to:
      in response to a login attempt from the terminal, acquire login information indicating a user from the terminal,
      search the memory for one of the pieces of user information corresponding to the user,
      determine a threshold value for determining whether to reject the login attempt at least based on the previous access attempts by the user,
      compare a number of the unsuccessful login attempts by the user with the determined threshold value, and
      determine whether to reject the login attempt based on a comparison result of the number of the unsuccessful login attempts and the threshold value, wherein
   each of the pieces of user information includes a password that was previously entered by a corresponding one of the users during a previous access attempt made by the corresponding one of the users,
   the acquired login information includes a first password entered by the user at the login attempt, and
   the processor is configured to:
      calculate a degree of similarity between the first password and the previously entered password included in said one of the pieces of user information, and
      determine the threshold value based on the calculated degree of similarity.

2. The information processing device according to claim 1, wherein the processor determines to reject the login attempt when the number of the unsuccessful login attempts exceeds the threshold value.

3. The information processing device according to claim 2, wherein
   each of the pieces of user information includes a valid password, and
   after the number of the unsuccessful login attempts exceeds the threshold value, the processor determines to reject the login attempt even when the first password matches a valid password included in said one of the pieces of user information.

4. The information processing device according to claim 1, wherein the processor is configured to determine the threshold value based on a difference between a time of the login attempt and a time of a last one of the previous access attempts by the user.

5. The information processing device according to claim 4, wherein the processor determines a smaller threshold value for a greater difference between a time of the login attempt and a time of the last one of the previous access attempts.

6. The information processing device according to claim 1, wherein the processor determines a smaller threshold value for a smaller degree of similarity between the first password and the previously entered password.

7. The information processing device according to claim 1, wherein the processor is configured to determine, as the degree of similarity, a distance of strings of the first password and the previously entered password.

8. The information processing device according to claim 1, wherein the processor is configured to determine the threshold value based on a frequency of the previous access attempts within a particular period.

9. The information processing device according to claim 1, wherein the processor is configured to determine the threshold value based on a number of packets related to the previous access attempts within a particular period.

10. An information processing method performed by an information processing device, the method comprising:

storing, in a memory, a plurality of pieces of user information each for authenticating a user of the information processing device and indicating previous access attempts to the information processing device and unsuccessful login attempts by the user;

in response to a login attempt from a terminal, acquiring login information indicating a user from the terminal;

searching the memory for one of the pieces of user information corresponding to the user;

determining a threshold value for determining whether to reject the login attempt at least based on the previous access attempts by the user;

comparing a number of the unsuccessful login attempts by the user with the determined threshold value; and determining whether to reject the login attempt based on a comparison result of the number of the unsuccessful login attempts and the threshold value, wherein each of the pieces of user information includes a password that was previously entered by a corresponding one of the users during a previous access attempt made by the corresponding one of the users, the acquired login information includes a first password entered by the user at the login attempt, and determining the threshold value includes:

calculating a degree of similarity between the first password and the previously entered password included in said one of the pieces of user information, and determining the threshold value based on the calculated degree of similarity.

11. A non-transitory computer readable medium storing a program causing a computer to execute a method comprising:

storing, in a memory, a plurality of pieces of user information each for authenticating a user of an information processing device and indicating previous access attempts to the information processing device and unsuccessful login attempts by the user;

in response to a login attempt from a terminal, acquiring login information indicating a user from the terminal;

searching the memory for one of the pieces of user information corresponding to the user;

determining a threshold value for determining whether to reject the login attempt at least based on the previous access attempts by the user;

comparing a number of the unsuccessful login attempts by the user with the determined threshold value; and determining whether to reject the login attempt based on a comparison result of the number of the unsuccessful login attempts and the threshold value, wherein each of the pieces of user information includes a password that was previously entered by a corresponding one of the users during a previous access attempt made by the corresponding one of the users, the acquired login information includes a first password entered by the user at the login attempt, and determining the threshold value includes:

calculating a degree of similarity between the first password and the previously entered password included in said one of the pieces of user information, and determining the threshold value based on the calculated degree of similarity.

* * * * *